(12) United States Patent
Behroozi et al.

(10) Patent No.: US 7,970,394 B2
(45) Date of Patent: Jun. 28, 2011

(54) DETERMINING COVERAGE OF A WIRELESS NETWORK

(75) Inventors: Cyrus Behroozi, Menlo Park, CA (US); Roman M. Arutyunov, San Diego, CA (US)

(73) Assignee: Tropos Networks, Inc., Sunnyvale, CA (US)

( * ) Notice: Subject to any disclaimer, the term of this patent is extended or adjusted under 35 U.S.C. 154(b) by 962 days.

(21) Appl. No.: 11/638,274

(22) Filed: Dec. 13, 2006

(65) Prior Publication Data

US 2008/0147846 A1    Jun. 19, 2008

(51) Int. Cl.
*H04W 24/00* (2009.01)
*H04W 40/00* (2009.01)
*G06F 15/173* (2006.01)

(52) U.S. Cl. .................... 455/423; 455/446; 709/224

(58) Field of Classification Search .................. 455/423, 455/446; 370/338; 709/224, 238
See application file for complete search history.

(56) References Cited

U.S. PATENT DOCUMENTS

| | | | |
|---|---|---|---|
| 5,758,264 A * | 5/1998 | Bonta et al. .................. | 455/67.7 |
| 6,788,926 B1 | 9/2004 | Frangione et al. | |
| 7,091,902 B2 | 8/2006 | Liu et al. | |
| 2002/0052201 A1 * | 5/2002 | Wilhelmsson et al. ........ | 455/434 |
| 2002/0129138 A1 * | 9/2002 | Carter ........................... | 709/224 |
| 2003/0100299 A1 * | 5/2003 | Ko et al. ........................ | 455/423 |
| 2003/0204619 A1 * | 10/2003 | Bays ............................. | 709/238 |
| 2005/0036487 A1 * | 2/2005 | Srikrishna .................... | 370/389 |
| 2005/0111485 A1 * | 5/2005 | Bruckmann et al. .......... | 370/465 |
| 2005/0134499 A1 | 6/2005 | Liu et al. | |
| 2005/0163144 A1 * | 7/2005 | Srikrishna et al. ............ | 370/431 |
| 2006/0017630 A1 | 1/2006 | Kildal | |
| 2006/0198359 A1 | 9/2006 | Fok et al. | |
| 2006/0224730 A1 | 10/2006 | Fok et al. | |
| 2007/0009053 A1 * | 1/2007 | Laroia et al. .................. | 375/260 |
| 2007/0010241 A1 * | 1/2007 | Wachter et al. ............... | 455/423 |
| 2007/0070911 A1 * | 3/2007 | Goldberg et al. ............. | 370/248 |
| 2007/0142028 A1 * | 6/2007 | Ayoub et al. ............... | 455/404.1 |

* cited by examiner

*Primary Examiner* — Erika A Gary
*Assistant Examiner* — Michael Mapa
(74) *Attorney, Agent, or Firm* — Brian R. Short

(57) ABSTRACT

An apparatus and method of determining coverage of a wireless network is disclosed. The method includes traveling to multiple locations around access points of the wireless network, and for a plurality of client applications, measuring a performance parameter between a test client device and nodes of the wireless network, at a plurality of the multiple locations.

27 Claims, 4 Drawing Sheets

DETERMINING COVERAGE OF A WIRELESS NETWORK

FIELD OF THE INVENTION

The invention relates generally to wireless communications. More particularly, the invention relates to a method and apparatus for determining coverage of a wireless network.

BACKGROUND OF THE INVENTION

Wireless mesh networks are gaining popularity because wireless infrastructures are typically easier and less expensive to deploy than wired networks. The wireless mesh networks typically include wired gateways that are wirelessly connected to wireless nodes, or wirelessly connected directly to client devices. Many wireless nodes can collectively form a wireless mesh, in which client devices can associate with any of the wireless nodes.

Wireless networks, however, can be more difficult to deploy and maintain than wired networks. That is, wireless networks are typically subjected to environmental influences that make operation of the networks more problematic than wired networks. For example, the wireless links of wireless networks can suffer from fading or multi-path, which degrade the quality of transmission signals traveling through the wireless links. Additionally, wireless networks that include multiple access points can suffer from self-interference.

During deployment of wireless networks, it is useful to have information regarding fading, multi-path and self-interference to allow for better deployment. Additionally, this information is useful after deployment to allow determination of the quality of possible network connections, and to provide information that can be used to improve the wireless networks.

It is desirable to have a method and apparatus for determining coverage a wireless network, allowing a system operator to make strategic upgrades to the network. It is also desirable to have measured network information available so that potential users can determine a level of expected performance.

SUMMARY OF THE INVENTION

One embodiment of the invention includes a method of determining coverage of a wireless network. The method includes traveling to multiple locations around access points of the wireless network, and for a plurality of client applications, measuring a performance metric between a test client device and nodes of the wireless network, at a plurality of the multiple locations. The performance metric can be, for example, a transmission data throughput, a signal jitter or latency.

Another embodiment includes a test client device that can be used for characterizing a wireless network. The test client device includes a means for traveling proximate to access nodes of the wireless network. The test client device characterizes a transmission data throughput between the wireless client test device an access nodes of the wireless network, at multiple locations, for a plurality of client applications.

Other aspects and advantages of the present invention will become apparent from the following detailed description, taken in conjunction with the accompanying drawings, illustrating by way of example the principles of the invention.

DETAILED DESCRIPTION

Figure 1:
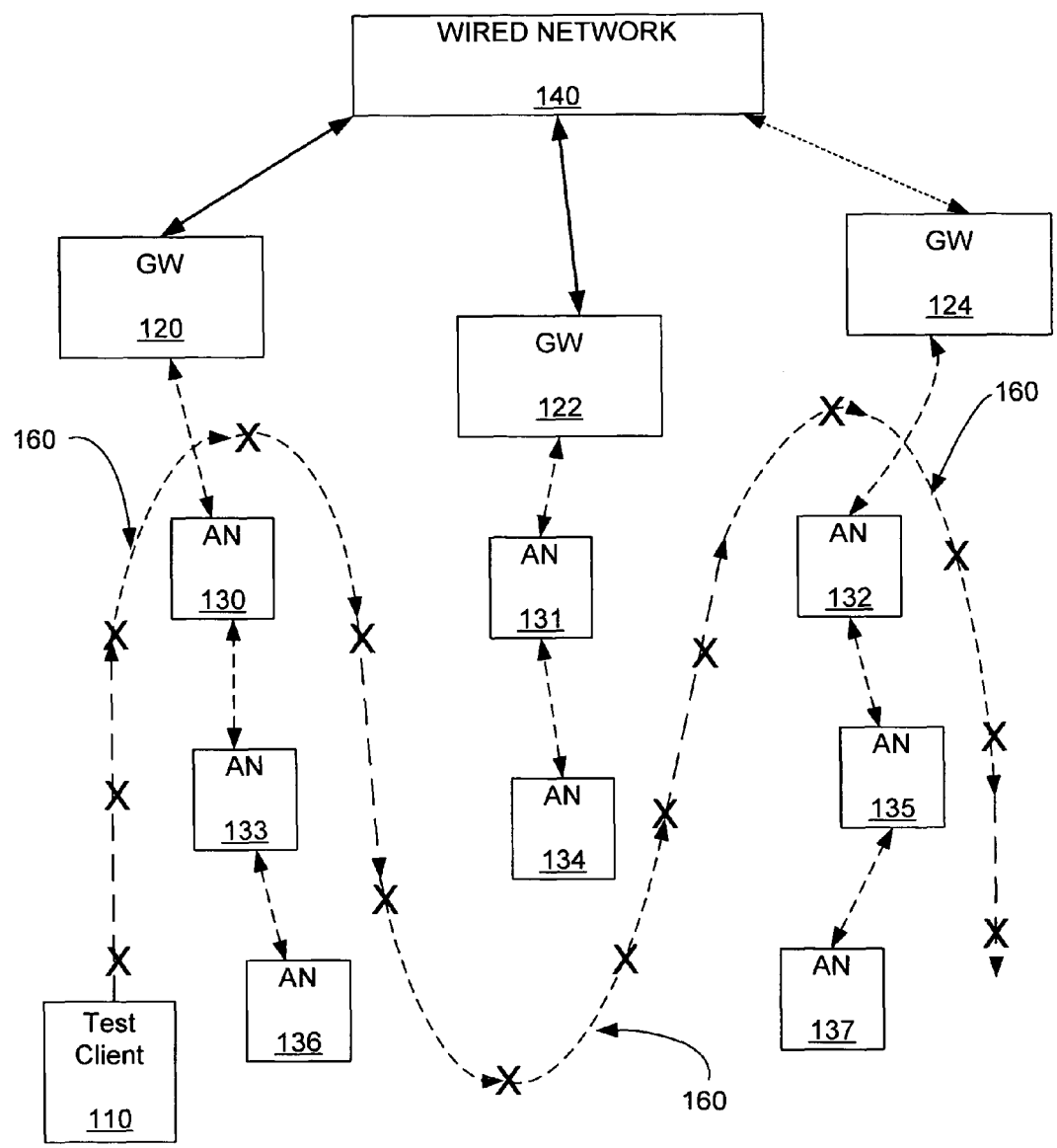
FIG. 1 shows a test device traveling around a wireless mesh network measuring a performance parameter of the wireless mesh network.

As shown in the drawings for purposes of illustration, the invention is embodied in methods for measuring a performance parameter of a wireless network. The methods provide the performance parameter measurements for different client applications. The performance parameter measurements can be used by network operators to improve performance of the wireless network. Additionally, users and potential users can use results of the performance parameter measurements to predict a level of expected performance.

FIG. 1 shows a test device 110 traveling around a wireless mesh network, and measuring a performance parameter (such as, transmission data throughput) at various test locations (each location depicted, for example, by an "X") of the wireless mesh network. An exemplary wireless network includes a wireless mesh network that includes gateways 120, 122, 124 and access nodes 130, 131, 132, 133, 134, 135, 136, 137. The gateways 120, 122, 124 can be wired or wirelessly connected to a wired network 140. The wired network 140 can be connected, for example, to the internet. The test locations shown in FIG. 1 are merely an example of possible test locations. Clearly, more, fewer, or different test locations can be used for characterizing the data throughput of the wireless mesh network. Generally, the denser the test locations are, the better the characterization of the network.

Client devices (not shown) can wirelessly connect to any of the gateways 120, 122, 124 and access nodes 130, 131, 132, 133, 134, 135, 136, 137, and therefore, obtain access to the wired network 140. As previously described, the wireless links between the gateways, access nodes and client devices, typically suffer from some level of fading, multi-path and interference. Characterizations of the wireless network can be useful in determining whether new gateways and access nodes should be added to the network, whether present gateways and access nodes should be moved, or eliminated. Additionally, the characterizations can be useful in predicting a level of expected performance.

The test client device 110 is used to characterize performance of the wireless network. As shown, the test client device 110 can be included within an automobile, for example, that drives around and within the network while the test client device characterizes network performance. The test client device 110 can travel a path 160, for example, and test performance of the wireless network at the various locations within the wireless mesh network.

The test client device can obtain its location information through a location determination service. The location determination service can be, for example, a global positioning system (GPS). As will be described, the test client device can record its location at each point a network measurement is made. The location information can be retrieved for display of performance of the network.

The described methods of characterizing the wireless network can provide a representation of the coverage of the wireless network. Generally, the coverage of the wireless network can be defined as performance (for example, data throughput) exceeding a pre-determined threshold, and the coverage is the fraction of the area of the network that exceeds the pre-determined threshold.

Characterizing Network Performance

One embodiment includes characterizing the performance of the wireless network by measuring the data throughput at the various locations within the network. The data throughput can provide a better indication of the health of the network than just transmission signal strength.

Testing throughput offers advantages over other performance metrics that can be measured. For example, data throughput measurements account for wireless network limitations such as self-interference, which measuring signal strength does not provide. Transmission signal impairments (such as multi-path and fading) can be reflected in transmission data throughput test. These signal impairments, however, may not be reflected in, for example, a transmission signal strength measurement.

Transmission data throughput tests can be bi-directional tests. That is, the throughput tests can include both the uplink and the downlink between the test client device and the node of the network being tested. Signal strength measurement tests are typically a measurement of signal strength from the test node to the test client device, and do not provide information of transmission quality of the uplink between the test client device and the test node.

The data packets of throughput tests can be configured to mimic different client applications. Therefore, the performance metric being measured can more accurately reflect the performance of the wireless network for each of the client application types, than a transmission signal strength measurement.

Additionally, transmission data throughput measurements are sensitive to air-time congestion. That is, within a network having many transmitting devices, the air-time available for transmission can become occupied, and can therefore, affect performance of a client connection to the network. Signal strength measurements however, do not reflect the air-time congestion of the network like data throughput measurements.

An embodiment for characterizing the data throughput includes the test client device transmitting a plurality of probe packets at a predetermined rate, and counting a number of responses from the nodes. For an 802.11 wireless network, the test client device transmits probe requests at a predetermined rate, and counts probe responses.

An embodiment includes each of the nodes of the mesh network being configuring with a common IP address. Each of the nodes may have an individual IP address, but additionally have the common IP address that can be used by the test client device for testing the network. Therefore, the test client device does not have to know the address of each node, improving mobility. Additionally, the test client device does not have to reconfigure for testing of each of the nodes.

Types of Client Applications

An embodiment includes determining the data throughput at various locations of the wireless network for multiple types of client applications. For example, client applications can include data, voice, video, streaming data and low demanding applications, such as, automatic meter reading.

The different types of client applications typically have different data types. Therefore, if the wireless network is being used for multiple types of client applications, it is useful to measure the performance parameters, such as, the transmission data throughput using the different data types of the different client applications. Basically, the data packets can be configured to mimic data packets of each of the plurality of client applications.

The different data types can have, for example, different data packet sizes. The size of a packet indicates the number of bit included within the packet, which can vary depending upon the client application. Additionally, the distribution of the data packets can vary. That is, the number of bits within each packet can vary from packet to packet during transmission. Additionally, the data packets can be transmitted at different intervals. That is, the time period between packets or the packets transmitted per second can be adjusted. Different client applications can include different transmission retry processes and age retries differently. Therefore, measuring the performance parameters at different intervals can be useful in characterizing the network for the different client applications.

Network Interference Characterizations

An embodiment includes additionally measuring transmission signal power throughout the wireless network. Based on anomalies between the measured transmission signal power and the measured transmission data throughput, areas of interference can be identified. That is, generally higher power transmission signals can provide a higher transmission data throughput because higher power signals generally have a higher SNR. However, if the transmission signal power is relatively higher, yet the transmission data throughput is relatively lower, it can be assumed that the transmission signal are being subjected to substantial amounts of interference.

Characterizing Multiple Links

An embodiment includes characterizing the data throughput for multiple links. That is, in addition to testing throughput between the client test device and an access node the client device is associated with, the throughput tests can be between the test client device and any end-point device associated with the network, or even outside of the network. As previously shown and described, wireless mesh networks include many devices that can be wired or wirelessly linked. An end-point device can be specified by an address, such as, an IP address. The client test device can exchange data with the end-point device according to the transmission protocol of the client application being tested. In one embodiment, the client test device sends requests to the end-point device, and counts the responses from the end-point device to determine an end-to-end data throughput value.

Presenting Results of the Characterization

Figure 2:
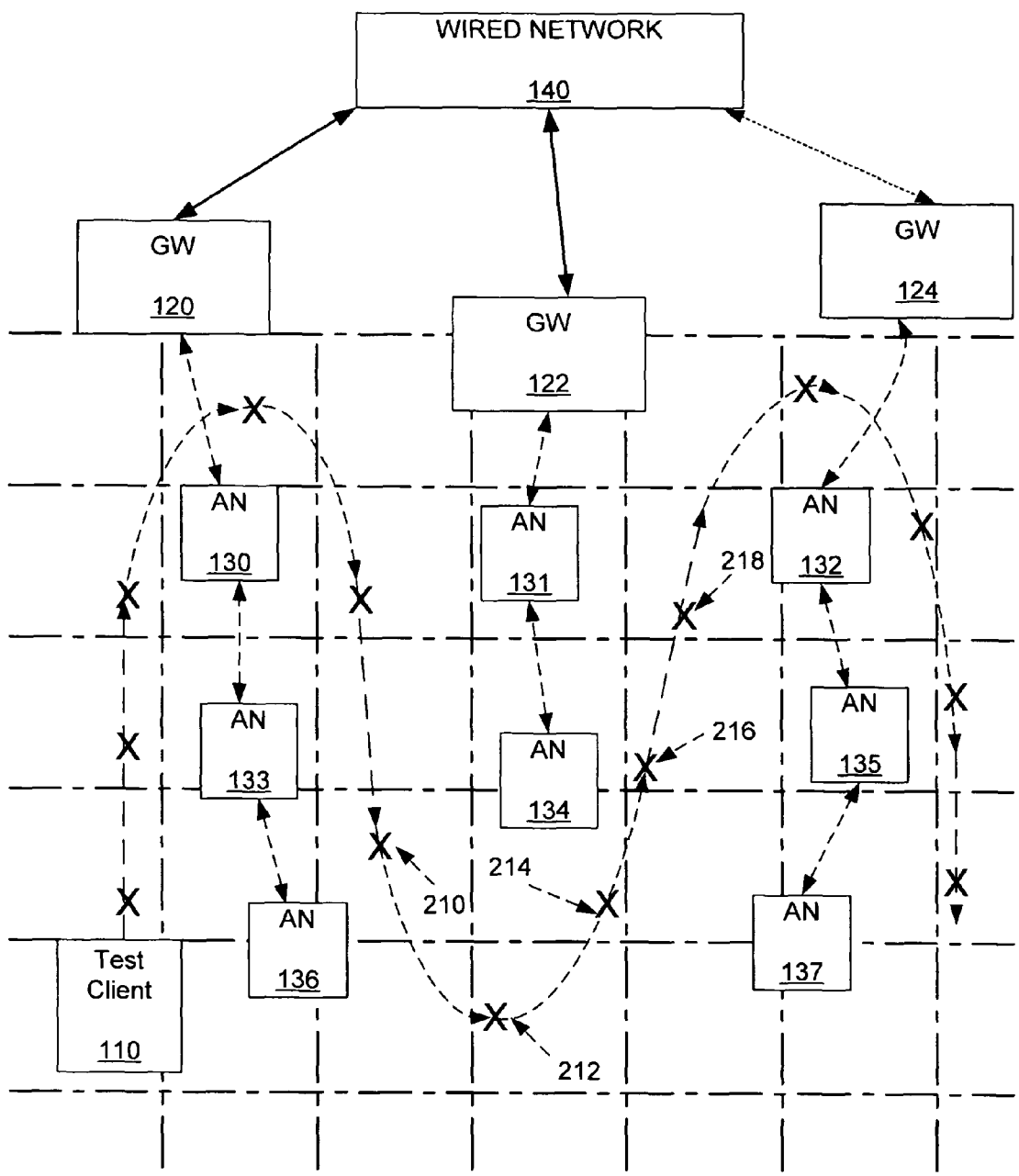
FIG. 2 shows the network of FIG. 1, having been sectored into grids.

An embodiment for reporting the results of the characterization includes dividing (sectoring) an area around the wireless network into grids. Performance of the wireless network within each grid can be estimated based upon, for example, the results of the throughput measurements for each of the client application types. FIG. 2 shows the network of FIG. 1, having been sectored into grids. A value of data throughput for each sector as defined by the grids can be determined based on the data throughput measurements by the test client device. As previously mentioned, the data throughput is characterized at several locations. Based upon the proximity of each of the locations with respect to the areas of the grids, data throughput estimates can be made for each of the grids.

As shown in FIG. 2, transmission data throughput characterized, for example, at test locations 210, 212, 214, 216, 218 can be used to estimate the transmission data throughput in each of the corresponding grid locations or grid points. The accuracy of the characterizations is dependent upon the size of the grids, and the number (density) of the test locations. A grid point (or grid location) can include more than one throughput characterization. A value for the grid point, can therefore, by influenced by more than one characterization location.

The determination of the throughput at each grid location can be determined by several throughput measurements. For one embodiment, measurements that are clearly erroneous are filtered (removed). The mean of the remaining measurements of a grid location can be determined, or an average of the remaining measurements can be used to estimate the throughput at each grid location.

The other measure parameters (for example, latency and jitter) can be estimated at each of the grid locations as well.

A coverage quality of the wireless network can be determined (and therefore, represented) by designating grid points that correspond with locations having a data throughput greater than a threshold as passing grid points, and calculating a percentage wireless network coverage by comparing the passing grid points with a total number of grid points characterized. The resulting percentage can be used to represent the coverage quality of the network.

Additionally, nodes that provide poor performance and nodes that are determined to be impaired, can be identified and recorded. Nodes can be identified as poor performers if, for example, they have a low transmission data throughput or are identified to have a limited transmission range (poor coverage). An operator of the network can use this information to improve the wireless network by moving, adding or removing nodes within the wireless network.

Results of the data throughput characterizations can be stored for future access and analysis. For example, the results at each tested location can be stored at in a server that is connected to the network. A network operator can gage the health of the network by accessing the performance parameter measurements. Additionally, potential future users can access the measured parameters to determine a level a quality of connection to the network the potential user could expect.

Figure 3:
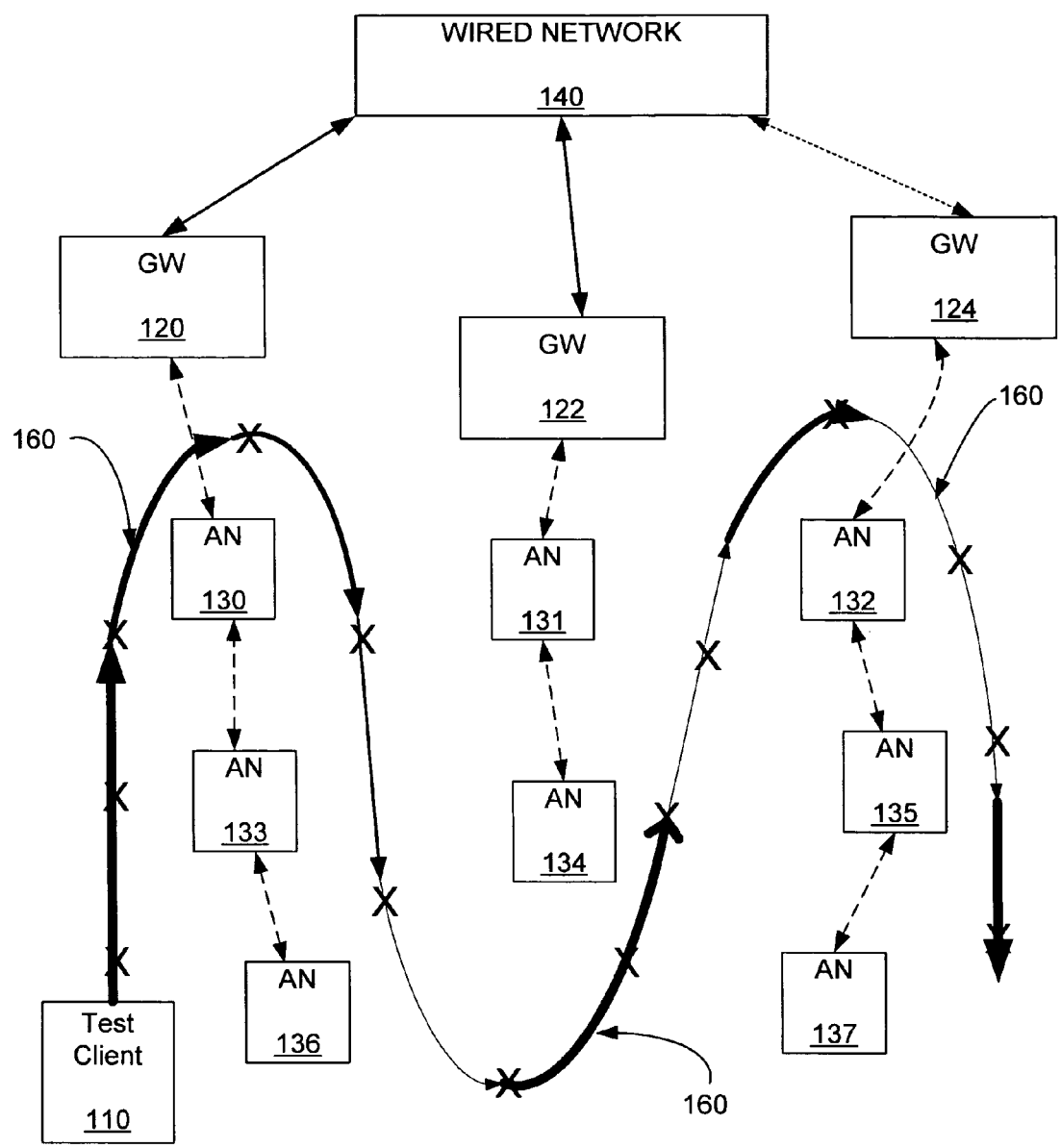
FIG. 3 is a map that shows levels of performance of the wireless network as determined by the methods of characterizing the wireless network.

FIG. 3 is a map that shows levels of performance (as determined by prior measurements of performance parameters) of the wireless network as determined by the methods of measuring performance parameters the wireless network. As shown, the path 360 traveled by the client test device 110 includes varying levels of measured performance. That is, as shown in FIG. 3, the thickness of the path 360 varies depending upon the value of the measured transmission data throughput. The visual depiction on the map of the value of the measured performance metric can be presented in many different ways. For example, the map can include varying colors in which each color represents a predetermined level of measured performance metric. The map can include representations at the points (locations) that measurements were actually made, or the map can additionally fill-in between measurement locations with values that are interpolated from between measured locations.

The map shown in FIG. 3 only shows the measured values over the path 360 in which the measurements were made. However, as described, the map can be filled in between measured values by, for example, interpolating the measured values at the locations of the path 360 in which actual measurements were made. It should be understood that any type of visual depiction can be used as long as different values of performance are distinguishable from each other.

An embodiment includes a real-time display of measured performance metrics. That is, the performance metrics are displayed as they are being measured. The real-time performance metrics can be displayed, for example, by showing the real-time measured performance metrics on a map. The data throughput can be indicated on the map by providing different colors on the map for different levels of data throughput.

Storage and Accessing of the Results of the Characterization

Various embodiments provide methods of storing the characterized data throughput, and subsequently providing characterizations for potential users of the network.

The results of the data throughput characterizations can be stored in a server that potential users of the wireless network can access to determine what level of network connection performance they could expect.

Figure 4:
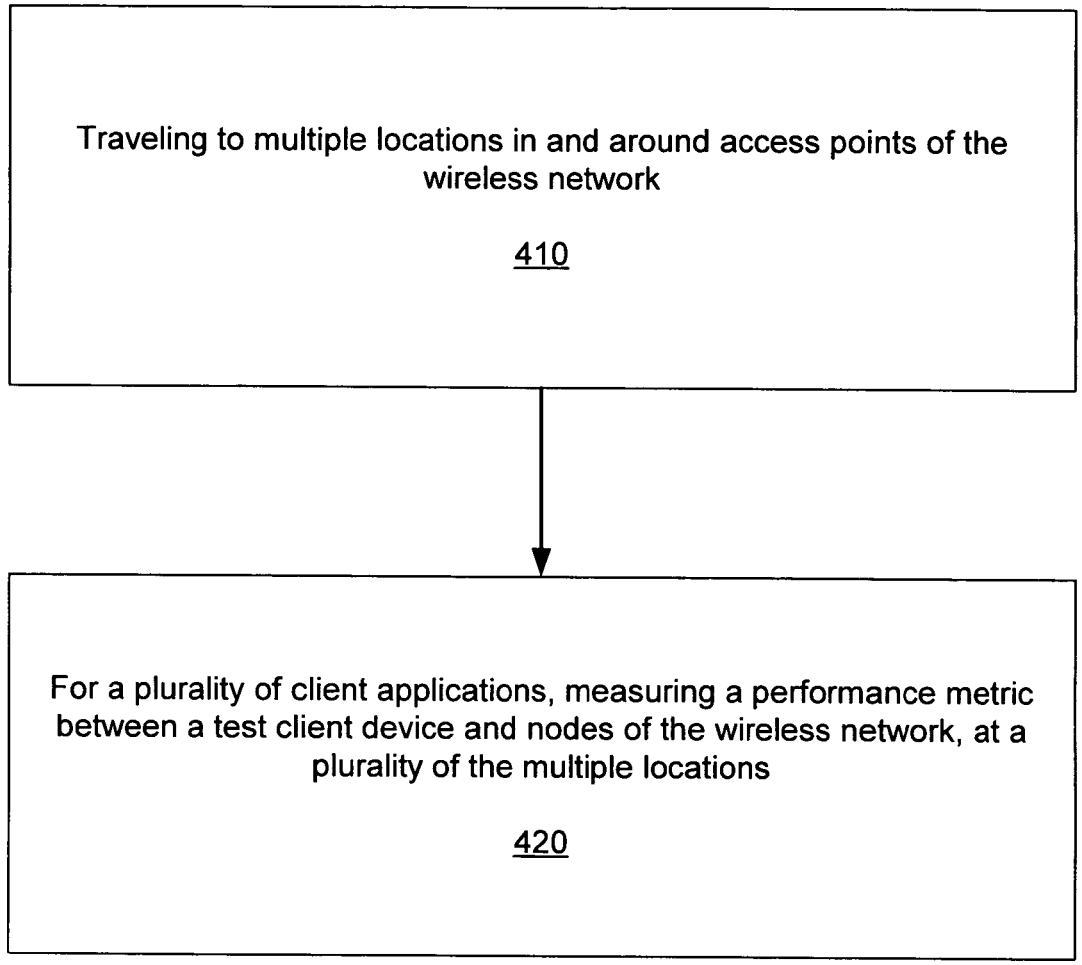
FIG. 4 is a flow chart that includes steps of an embodiment of a method for determining data throughput of a wireless network.

FIG. 4 is a flow chart that includes steps of an embodiment of a method for determining coverage of a wireless network. A first step 410 includes traveling to multiple locations in and around access points of the wireless network. Around the access points can be defined as being within the range of the access point. Around the access points can also be defined as within that range of the access points, and just outside the range of the access points. A second step 420 includes for a plurality of client applications, measuring a performance metric between a test client device and nodes of the wireless network, at a plurality of the multiple locations. Exemplary performance metrics include transmission data throughput, jitter and/or latency.

One embodiment for characterizing the data throughput at each of the plurality of locations includes the test client device transmitting a plurality of probe packets at a predetermined rate, and counting a number of responses from the nodes. The latency can be determined by timing response, and determining the timing between the test client device and the node being tested. Jitter is determined by the variation in the latency between multiple responses.

Ping packets can be use for determining throughput of an 802.11 link between an access test client device and an access node of a wireless mesh network. First, the test client device intentionally corrupting ping packets by manipulating a checksum (layer 3) of the ping packets while maintaining a proper CRC of the ping packets. The test client sends the corrupted ping packets to the access node. The test client device estimates a number of packets received by the access node by counting how many layer 2 responses the test client device receives back from the access node. The throughput is estimated by multiplying the number of packets received by a size of the packets, and dividing a result by a transmit time.

Ping Packets

TCP/IP protocols can facilitate in identification of network problems. One of the most frequently used debugging tools invokes ICMP echo request and echo reply messages. On many systems, the command invoked to send ICMP echo requests is named "ping". Sophisticated versions of ping send a series of ICMP echo requests, capture responses, and provide statistics about datagram loss. The ping allows specification of the length of the data being sent and the interval between requests. Less sophisticated versions merely send one ICMP echo request and await a reply.

The ping packets include a cyclic redundancy check (CRC) and a checksum. The ping packets that have a corrupted checksum will not generate a response at the second host. However, the layer two CRC associated with 802.11 packets, do generate a response. The CRC response only includes a very small number of bits, and therefore, does not interfere with downlink throughput. The corrupted ping packets do not generate a response.

The measurements can be made for the different client applications can be measuring one or more of the measurement parameters while setting the data packets of the transmissions between the client test device and the node being tested according to the protocols of each of the client applications. The can include setting the packet size, packet type and packet interval. The data packets during the measurement attempt to mimic the data packets of the different client types.

Additional measurements, such as, signal strength can also be made and used for determining areas of the wireless network that are suffering from interference, such as, self-interference. These areas can be identified by observing inconsistencies or anomalies between the signal strength measurements and the performance metric measurements.

The performance metrics can be measured for a single link between the client test device and the test node, or for multiple links (wired and wireless) between the client test device and test node.

For presenting the measured performance parameters, an area of the wireless network can be sectored into grid points. Each of the locations is associated with a grid point. Grid points that correspond with locations having a measured performance parameter greater than a threshold can be designated as passing grid points. A percentage of coverage of the wireless network is calculated by comparing the passing grid points with a total number of grid points in which the performance metric was measured. Additionally, poor performing and impaired nodes are identifies and recorded. Poor performing nodes can be identified as nodes that have a lowest data throughput, or provide the least coverage.

The measured performance metrics can be stored for future access and analysis. One embodiment includes generating a database that includes the locations and the measured performance metric. The locations can be either the actual test locations, or the locations can be test locations and locations in which performance metrics are calculated rather than measured.

The database can be accessed (for example, through the internet) for determining how well the wireless network is working, or to provide a potential user with an estimated expected performance. That is, based on a requested location, the database can be accessed, and a projected level data throughput can be estimated at the requested location based on the locations and measured performance metric of the database.

One method of providing the measured and calculated performance metrics is to visually depict the values of the performance metrics on a map of the area in which the wireless network is located. For example, different levels of performance can be depicted with different colors.

Although specific embodiments of the invention have been described and illustrated, the invention is not to be limited to the specific forms or arrangements of parts so described and illustrated. The invention is limited only by the appended claims.

What is claimed:

1. A method of determining coverage of a wireless mesh network, comprising: traveling to multiple locations in and around access points of the wireless network; for a plurality of client applications, measuring a performance metric of multiple wireless links including a wireless link between a test client device and an access node, and a wireless link between the access node and a gateway of the wireless network, at a plurality of the multiple locations; the method further comprising: sectoring an area of the wireless network into grid points; associating each of the locations with a grid point; designating grid points that correspond with locations having a data throughput greater than a threshold as passing grid points; calculating a percentage of wireless network coverage by comparing the passing grid points with a total number of grid points in which the performance metric was measured.

2. The method of claim 1, wherein the performance metric comprises a data throughput.

3. The method of claim 2, wherein characterizing the data throughput at each of the plurality of locations comprises the test client device transmitting a plurality of probe packets at a predetermined rate, and counting a number of responses from the nodes.

4. The method of claim 1, wherein measuring the performance metric for the plurality of client applications comprises measuring the performance metric for multiple types of data.

5. The method of claim 4, wherein the multiple types of data comprises multiple packet sizes, multiple packet types and multiple intervals.

6. The method of claim 5, further comprising measuring the performance metric with a one of the multiple data types depending upon the client application.

7. The method of claim 1, wherein measuring the performance metric for the plurality of client applications comprises additionally characterizing latency and jitter between the test client device and the nodes at the plurality of locations.

8. The method of claim 1, wherein measuring the performance metric for the plurality of client applications comprises measuring the performance metric while transmitting data packets that mimic data packets of each of the plurality of client applications.

9. A method of determining coverage of a wireless network, comprising: traveling to multiple locations in and around access points of the wireless network; for a plurality of client applications, measuring a performance metric of multiple wireless links between a test client device, and nodes in the wireless network, at a plurality of the multiple locations; measuring signal strengths of nodes of the wireless network; identifying potential self-interference areas of the wireless network based on the measured signal strengths, and the measured performance metric; the method further comprising: sectoring an area of the wireless network into grid points; associating each of the locations with a grid point; designating grid points that correspond with locations having a data throughput greater than a threshold as passing grid points; calculating a percentage of wireless network coverage by comparing the passing grid points with a total number of grid points in which the performance metric was measured.

10. The method of claim 9, wherein the self-interference areas are identified by identifying anomalies between the measured signal strength of each node and a data throughput of each node.

11. The method of claim 1, wherein a single wireless link is between the test client device and the access node of the wireless network.

12. The method of claim 1, wherein multiple wireless links are between the test client device and the access node of the wireless network.

13. The method of claim 1, further comprising characterizing the performance metric between the client device and a device that is either a part of, or directly or indirectly connected to the wireless network.

14. The method of claim 1, further comprising recording identifications of the access nodes of the wireless network and reporting poor and dead access nodes.

15. The method of claim 14, wherein poor access nodes are identified as access nodes that have a lowest data throughput, or provide the least coverage.

16. The method of claim 1, further comprising real-time displaying of measured performance metrics.

17. The method of claim 16, wherein real-time displaying of the measured performance metrics comprises showing the real-time measured performance metrics on a map.

18. The method of claim 17, wherein a data throughput is indicated on the map by providing different colors on the map for different levels of data throughput.

19. The method of claim 1, further comprising:
generating a database of the locations and the measured performance metric.

20. The method of claim 19, further comprising:
receiving a requested location;
accessing the database, and estimating a projected level of data throughput at the requested location based on the locations and measured performance metric of the database.

21. The method of claim 20, wherein the measured the performance metric is indicated on a map that includes the wireless network.

22. The method of claim 21, wherein a data throughput is indicated on the map by providing different colors on the map for different levels of data throughput.

23. The method of claim 1, further comprising configuring the access nodes with a common IP address.

24. The method of claim 1, wherein measuring the performance metric comprises the test client device sending IP packets that only receive layer 2 acknowledgements.

25. The method of claim 24, wherein the IP packets comprise ping packets with incorrect layer 3 checksums.

26. The method of claim 1, wherein the test client device obtains its location information through a location determination service.

27. The method of claim 26, wherein the location determination service is GPS.

* * * * *